D. H. HOUGHTON.
FILM PACK.
APPLICATION FILED DEC. 15, 1913.
1,120,498.
Patented Dec. 8, 1914.
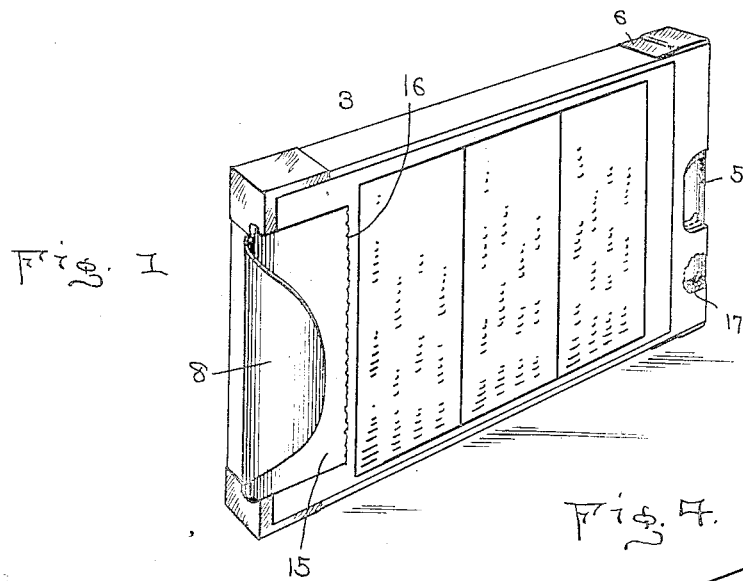
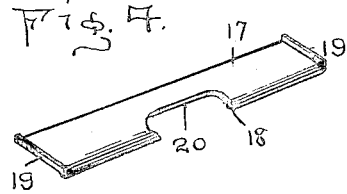
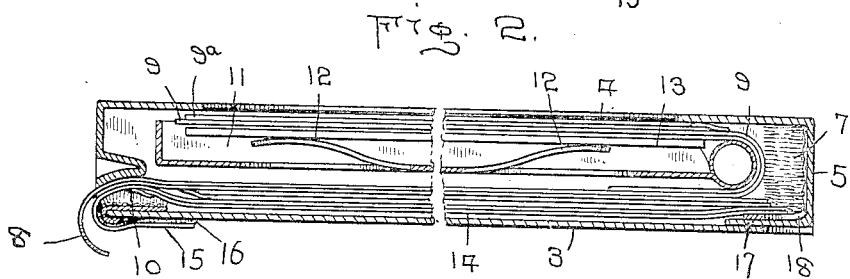
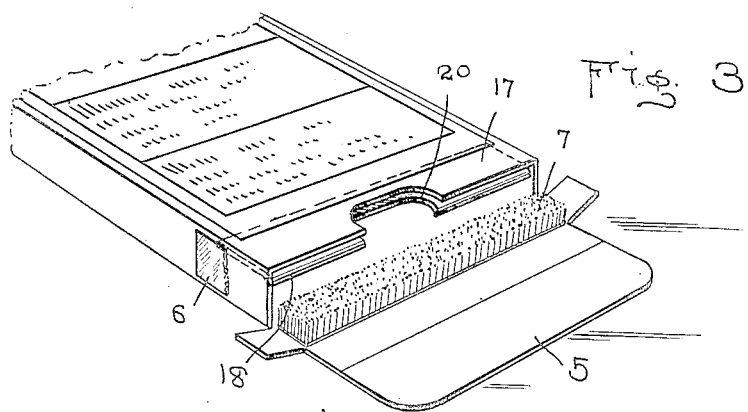
Witnesses
Inventor
D. H. Houghton
By W. J. FitzGerald & Co.
Attorney

UNITED STATES PATENT OFFICE.

DAVID H. HOUGHTON, OF STAHL, MISSOURI.

FILM-PACK.

1,120,498.

Specification of Letters Patent. Patented Dec. 8, 1914.

Application filed December 15, 1913. Serial No. 806,894.

*To all whom it may concern:*

Be it known that I, DAVID H. HOUGHTON, citizen of the United States, residing at Stahl, in the county of Adair and State of Missouri, have invented certain new and useful Improvements in Film-Packs; and I do hereby declare the following to be a full, clear, and exact description of the invention, such as will enable others skilled in the art to which it appertains to make and use the same.

This invention has relation to film packs such as disclosed in Patent No. 917,136 to J. A. Robertson April 6, 1909, and others of similar construction and has for its object to provide reliable means for excluding light from the film pack after the latter has been opened and any one or more of the films have been removed for development, before the entire pack has been exhausted.

In the accompanying drawings wherein is shown a practical and approved embodiment of the invention, Figure 1 represents a perspective view of a film pack of known construction to which this invention has been applied, Fig. 2 represents a central longitudinal sectional view through the pack, Fig. 3 represents a fragmental, perspective view of one end thereof in open position, and Fig. 4 represents a perspective view of the guide strip removed.

Referring to the drawing in detail, wherein similar reference numerals designate corresponding parts throughout the several views, the numeral 3 designates the body of the receptacle or pack in the front wall of which is formed an exposure opening 4. One end of the body 3 is provided with a tucking flap 5 which is secured closed during transit from the factory to the consumer by sealing strips 6, and is provided on its inner face with a suitable strip of light excluding material 7. The opposite end of the body is provided with a suitable opening through which project the operating ends or tabs 8 of the film backing sheets 9. This opening is closed against the entrance of light by a suitable strip 10.

Within the receptacle or body is arranged the film tray 11 having spring tongues 12 struck out therefrom normally pressing the follower part 13 toward the opening 4. It will be understood that each film backing sheet 9 is attached to a section of film 9ª, and these films are originally stored within the film tray 11, and are adapted to be successively presented to the opening 4 for exposure as the operating ends or tabs 8 thereof are pulled so as to draw the film backing sheet 9 and the film 9ª attached thereto around and behind the tray 11.

Each film pack is provided with a safety cover 14 which is originally disposed between the exposure opening 4 and the adjacent films 9ª for protecting the latter against the rays of light. This safety cover 14 is arranged within the film pack similarly to the film backing sheet 9 and is provided with a suitable operating end or tab projecting through the end of the receptacle similarly to the tabs 8.

After the film pack is loaded in the camera, the first film is presented for exposure by drawing out the tab of the safety cover 14, which pulls the safety cover from its position in front of the first film, and around to the back of the pack. The tabs of both the safety cover 14 and the film backing 9 after withdrawal, are torn off and thrown away.

The parts of the film pack, so far described are constructed and arranged as disclosed in Patent 917,136, to J. A. Robertson, and I do not claim any of these parts or their arrangement as my invention, the same being merely shown to illustrate the application of my invention thereto.

When it is desired to remove any one or more of the exposed films from the pack for development, it is necessary to remove the pack to a dark room and there open the flap 5 and remove the films through this end of the receptacle. Invariably the safety cover 14 is removed with the films and it is thus apparent that when the pack is again taken in the light after reclosing the flap 5, light is permitted to leak between the back of the receptacle 3 and the flap 5 and act upon the adjacent films. The loss of the safety cover 14 results in "light struck" negatives. To overcome this objection, I provide means positively insuring against the removal of the safety cover, and additional means positively insuring that said cover occupies its proper position relative to the inserted end of the tucking flap 5. The means for preventing the removal of the safety cover 14 consists in applying to the tab of said safety cover 14 a transversely disposed strip of dry adhesive 15 adapted, after said cover has been withdrawn, to be moistened and secured against the back of the pack as clearly shown in Fig. 2.

The portion of the tab of the safety cover 14 adjacent the strip of adhesive 15 is preferably perforated as at 16 so that the useless end thereof may be conveniently torn off and discarded.

It is obvious that the safety cover 14 is useless in protecting the films, unless it is disposed between the inserted end of the tucking flap 5 and the films 9ª. Naturally if the safety cover 14 is disposed between the inserted end of the flap 5 and the back of the receptacle 3, the films 9ª will not be protected against light entering between said inserted end and the safety cover. In the film packs as now constructed it is absolutely impossible to properly position the end of the flap 5 when re-closing the pack, especially in view of the fact that the pack must be manipulated in a dark room. I, therefore provide a guide strip 17 adapted to coöperate with the stationary safety cover to exclude the light. The guide strip 17 is secured at its ends 19 to the inner faces of the opposite longitudinal walls of the receptacle 3 and is spaced from the back of said receptacle a distance approximately corresponding to the thickness of the material composing the tucking flap 5. The outer longitudinal edge of the strip 18 is turned inwardly toward the center of the pack and is notched or recessed at 20 similarly to the back of the receptacle so as to provide means for the convenient removal of the films. The strip is of adequate width to lie between the extreme inner end of the safety cover 14 and the back of the receptacle 3, thus positively insuring that the end of the tucking flap 5 is inserted between the guide strip 17 and the back of the receptacle, absolutely protecting the films against light.

It will be apparent that the turned edge 18 of the guide strip 17 is extremely important and convenient when re-closing the flap 5 which operation is necessarily performed in a dark room.

What I claim is—

1. In combination, a receptacle having film chambers and a notch in the rear wall thereof, a removable flap normally closing one end of said receptacle, and a guide strip for insuring the proper positioning of the flap and having a notch corresponding to the notch in the rear wall of the receptacle adapted to permit convenient access to the films.

2. In combination, a receptacle having film chambers and a normally closed end, a safety cover, means for securing said safety cover against removal from the normally closed end of said receptacle.

3. In combination, a receptacle having a normally closed end, a safety cover, means for securing said safety cover against removal from the normally closed end of said receptacle, and means coöperating with said safety cover in its secured position to exclude light from the receptacle.

4. A film pack comprising a casing having parallel film chambers adapted for the reception of films attached to backing sheets having manipulating tabs, one of said chambers having an exposure opening, the other chamber having a normally closed end, said chambers being provided with communicating passages, a removable portion on the casing for permitting the removal of films from the normally closed chamber, and a guide strip secured in the end of said casing adapted to coöperate with the normally closed end of the casing in reclosing the pack absolutely light tight after the latter has been once opened.

5. A flat film package comprising a normally closed casing having chambers for exposed and unexposed films extending in parallel planes, said chambers for the passage of films from one chamber having a communicating passage to the other, a safety cover, a guide strip secured in one end of the rear chamber to coöperate with one end of the safety cover thereof in excluding light from the package, said package being adapted to contain films with backing sheets and manipulating tabs extending through the passage and chamber and projecting from one end of the package.

6. In combination, a receptacle having film chambers, a normally closed flap in one end of said receptacle, a safety cover, a strip secured in said receptacle and having one of the longitudinal edges thereof turned and adapted to guide the flap into proper position relative to the safety cover to exclude light from the receptacle.

7. In combination, a receptacle having film chambers, a normally closed flap in one end of said receptacle, a safety cover, a strip constituting a guide for the flap to direct the latter into a predetermined position relative to said safety cover, said flap and said safety cover constituting co-acting means whereby light is excluded from the receptacle, and a turned down portion formed upon the end of said strip to facilitate the movement of said flap.

8. In combination with a film pack, having a removable closure at one end, communicating film chambers positioned in said film pack, a safety cover likewise positioned within said pack, means whereby said safety cover is secured against removal during the operation of said removable closures, a guide strip so positioned in respect to said safety cover and said movable closures as to constitute means for forming therewith a light tight joint, and an arcuate bend formed upon the outer edge of said guide strip to facilitate the operation of said removable closure.

In testimony whereof I have signed my name to this specification in the presence of two subscribing witnesses.

DAVID H. HOUGHTON.

Witnesses:
F. J. BRAGG,
ROBERT WHITWORTH.